3,092,564
IRRADIATION OF WAX
Bertrand W. Greenwald, Portland, Conn., assignor to Cities Service Research and Development Company, New York, N.Y., a corporation of New Jersey
No Drawing. Filed Mar. 8, 1960, Ser. No. 13,436
3 Claims. (Cl. 204—162)

This invention relates to wax coating compositions and more particularly to a novel process for improving the gloss stability of selected wax coating compositions by subjecting the same to gamma radiation.

In the use of petroleum waxes to coat paper a high degree of gloss on the surface of the coated paper is normally desired. This is especially true in the case of products such as bread wrappers and waxed paper of the type which is used extensively in the home for wrapping various foods for temporary storage. Unfortunately, wax coating compositions used for this purpose normally suffer a substantial loss of gloss during storage for even relatively short periods of time such as one week. Since retention of high gloss until the time of ultimate sale and use of products such as waxed paper is considered a strong selling point, it is obviously desirable to increase the gloss stability of wax coating compositions used in coating paper so that the gloss retained after a period of time is as close as possible to the initial gloss of the composition as applied to the paper products.

It is an object of the present invention to provide a novel process for improving the gloss stability of selected wax coating compositions.

It is another object of the invention to provide a novel process for treating wax coating compositions to improve the gloss retention thereof.

In accordance with a preferred embodiment of the present invention the gloss stability of a wax coating composition comprising a blend of paraffin and microcrystalline waxes is improved by subjecting the wax composition to gamma radiation.

The paraffin waxes included in wax coating compositions treated in accordance with the invention are petroleum waxes which are removed from distillates or overhead stocks by conventional means such as pressing and sweating or solvent dewaxing and deoiling processes. These waxes ordinarily have melting points in the general range of between about 120 and about 150° F. and comprise primarily straight chain paraffins, although minor amounts of non-linear components such as branched chain paraffins may be present in amounts ranging up to about 20 weight percent. (Melting points referred to in this application are American melting points which are 3° F. higher than ASTM melting points.) The molecular weight of typical paraffin waxes is frequently within the range of between about 350 and about 450 while viscosities at 210° F. typically range between about 35 and about 50 Saybolt Universal seconds (SUS). The oil content of these waxes is frequently below about 1%. Paraffin waxes having melting points between about 140 and about 150° F. and containing less than about 1% oil are particularly suitable for use in wax compositions treated in accordance with the invention.

Microcrystalline waxes suitable for inclusion in wax coating compositions to be treated in accordance with the invention may be any conventional microcrystalline waxes. These waxes are distinguished from paraffin waxes in that the microcrystalline waxes are made up primarily of non-linear materials such as isoparaffins and naphthenes, although some normal paraffins may be present. Also, the molecular weight of microcrystalline wax is generally higher than that of paraffin wax, frequently being in the range of between about 550 and about 750, more usually between about 600 and about 700. Typical microcrystalline waxes may have melting points between about 150 and about 200° F. and the oil content of these waxes may vary from 0 up to about 15 weight percent. The oil content of microcrystalline waxes as well as the oil content of paraffin waxes depends primarily upon the degree to which the waxes have been refined or deoiled. Microcrystalline waxes are generally obtained from the higher boiling residual petroleum fractions and may be obtained by conventional means such as solvent extraction and dewaxing processes. Microcrystalline waxes melting between about 170 and about 200° F. and containing up to about 5% weight percent oil are especially suitable for use in wax coating compositions treated in accordance with the present invention.

The wax coating compositions suitable for treatment in accordance with the present invention include compositions comprising a major proportion of paraffin wax and minor proportions up to about 50 weight percent of microcrystalline wax. Especially suitable wax compositions are, for instance, those comprising major proportions of paraffin wax and containing between about 0.1 and about 25, preferably between about 0.5 and about 10, weight percent microcrystalline wax. The paraffin wax content of wax compositions treated in accordance with the invention may consist of just one paraffin wax or may be a blend of paraffin waxes. Likewise, the microcrystalline wax content may be obtained as one wax fraction or may be obtained by blending two or more fractions of microcrystalline wax. Such wax coating compositions may also contain, in addition to the paraffin and microcrystalline wax fractions, other suitable components such as minor quantities of polyethylene, oxidation inhibitors, or other appropriate additives.

In subjecting wax coating compositions of the type described above to gamma radiation in accordance with the present invention the wax composition may be subjected to any suitable amount of gamma radiation with dosages on the order of between about $10^7$ and about $10^9$ roentgens being preferred. The total dosage of gamma radiation received by the wax composition may be received at any suitable rate, but relatively high rates such as about $10^5$ or $10^6$ roentgens per hour are usually preferred in order to make efficient use of the relatively expensive materials and facilities required for radiation treatment. It should be understood, however, that insofar as is known the rate at which the total radiation dosage is applied to the wax composition does not effect the end result of increased gloss stability.

Any suitable means may be used for subjecting wax coating compositions to gamma radiation in accordance with the invention. For instance, the gamma radiation may come from suitable sources such as cobalt 60 or other natural or artificial gamma emitters. The wax composition to be treated may be placed in a container in a shielded radiation chamber and subjected to radiation from a suitable source for the length of time necessary to obtain the desired total dosage of radiation or the wax composition may be passed in a solid or liquid state continuously through or past the radioactive source material. Alternatively, the radioactive source material may be placed within the mass of wax composition to be irradiated. It is also contemplated that the irradiation treatment may be carried out simultaneously with other treating processes although separate treatment is normally preferred due to the necessity for shielding operating personnel from the effects of the gamma radiation.

Treatment of wax coating compositions in accordance with the present invention may be carried out under any suitable operating conditions in any suitable atmosphere such as air or nitrogen. While very satisfactory results have been obtained at ordinary room temperatures and atmospheric pressures, it has been found that irradiation under a nitrogen atmosphere is superior to irradiation in the presence of ordinary air and the use of a nitrogen atmosphere is therefore preferred. It should also be understood that any other suitable temperatures and pressures may be used and especially it is contemplated that higher temperatures, e.g. on the order of 100 to 300° F., may be used if it is desired to have the wax in liquid form during treatment. Radiation treatment of wax compositions under higher temperatures and pressures as well as treatment under conditions of lower temperatures such as down to about minus 40° F. and under subatmospheric pressures is also contemplated. Where the radiation treatment is a continuous process, the rate of flow of the wax composition past the radiation source will, of course, depend upon the radiation dosage rate and the total desired dosage.

The following specific examples will illustrate the application of the present invention to the treatment of a typical wax coating composition which is especially adapted for use in coating waxed paper.

EXAMPLE 1

In order to evaluate the treatment of the present invention a wax having the following properties was used:

Melting point (AMP) _____ 143.5° F.
Oil content _____ 0.25 wt. percent.
Saybolt color _____ 30.
Tensile strength @ 73° F. _____ 412 p.s.i.

This wax composition consisted of a blend of 70 weight percent light intermediate neutral (LIN) wax and 30 weight percent 200 neutral wax to which 1 weight percent microcrystalline wax had been added. The light intermediate neutral wax, 200 neutral wax and microcrystalline wax used in formulating this wax composition had the following properties:

|  | 200 Neutral Wax | LIN Wax | Microcrystalline Wax |
|---|---|---|---|
| Oil Content (wt. percent) | 0.12 | 0.2 |  |
| Melting point (° F.) | 139 | 148 | 185. |
| Saybolt Color | 30 | 30 |  |
| Tensile Strength (p.s.i.) | 400 | 392 |  |
| Penetration @ 77° F. | 11 | 13 | 66 @ 110° F. |
| Viscosity @ 175° F. (cs.) | 5.61 | 7.28 | 95.8 SUS. |
| Gravity (°API) |  |  | 35. |

The microcrystalline wax used in this wax composition was recrystallized microcrystalline wax obtained from a residual petroleum fraction by conventional means while the light intermediate neutral and 200 neutral waxes were obtained from solvent deoiling of light intermediate neutral and 200 neutral oils having the following properties.

Boiling point range: Viscosity @ 100° F., SUS
200 neutral wax, 660–925° F. _____ 200
Light intermediate neutral wax, 690–978° F. ___ 360

To obtain the light intermediate neutral and 200 neutral waxes the respective oil fractions were separately cooled in mixed methyl ethyl ketone (MEK)-benzene to about 0° C. and were then filtered. Wax which collected on the filter cloths still contained about 70 weight percent oil and was rerun through the MEK units to bring the oil content down to below about 0.5 weight percent. The wax was then filtered through active clay to bleach it and was then used in blending the wax composition described above.

Three 250 cc. samples of this wax coating composition were then prepared and placed in beakers. One of these samples was irradiated with $10^8$ roentgens of gamma radiation from a cobalt 60 source in an air atmosphere at the rate of $5.5 \times 10^5$ roentgens per hour. Another of these samples was irradiated under similar conditions, but under a nitrogen atmosphere while the third sample was not irradiated and was used as control sample. Following irradiation each of the three samples of wax coating composition was used to coat samples of wax coated paper in an identical manner and the waxed paper thus prepared was subjected to tests to determine the initial gloss and gloss retained after storing for seven days at constant temperature.

In coating paper with the wax coating composition samples described above, a standard bread wrapper paper was used and was coated with about 7 lbs. per ream of surface wax under controlled coating conditions so that all three samples received uniform coatings of the same amount of wax. These coating operations were carried out in accordance with Cit Con procedure W–31 as revised April 2, 1956.

The finished waxed paper samples were then tested with a Hunter Lab model D–16 gloss meter equipped wtih a 50% (Pink tile) reference standard to determine the 20° specular initial gloss of wax applied to the paper. Following the determination of the initial gloss by this manner, the waxed paper specimens were stored at a constant temperature of 73° F. and 50% relative humidity for seven days and the retained gloss was then measured in the same manner. The results of these tests were reported below with each reported result representing the average of ten readings.

Table 1

EFFECT OF GAMMA RADIATION ON GLOSS AND GLOSS STABILITY OF WAX COATING COMPOSITION

|  | unirradiated | irradiated in air | irradiated in $N_2$ |
|---|---|---|---|
| Initial gloss | 24 | 20 | 28 |
| Gloss retained after 7 days @ 73° F. | 6.7 | 16.8 | 26.0 |

In order to ascertain the effect on the radiation treatment of omitting the microcystalline wax component from the wax coating composition treated in accordance with the invention, each of the paraffin wax components described above, e.g. 200 neutral wax and light intermediate neutral wax, was subjected to $10^8$ roentgens of gamma radiation under a nitrogen atmosphere in the manner described above in connection with the wax coating composition. The results of gloss and gloss retention tests on the irradiated and unirradiated samples of the 200 and light intermediate neutral waxes are reported in Table 2 below:

Table 2

EFFECT OF GAMMA RADIATION ON GLOSS AND GLOSS STABILITY OF 200 AND LIGHT INTERMEDIATE NEUTRAL WAXES

|  | 200 Wax | | LIN Wax | |
|---|---|---|---|---|
|  | unirradiated | irradiated | unirradiated | irradiated |
| Initial Gloss | 25 | 25 | 33 | 28 |
| Gloss retained after 7 days at 73° F. | 25 | 22 | 25 | 32 |

In order to evaluate the effect of micro wax on the gloss retention of paraffin waxes not subjected to radiation, a sample of the 200 neutral paraffin wax described above and a sample of the same wax containing 1% of the microcrystalline wax described above were tested for initial gloss and retained gloss in the manner described above. The results of the gloss tests on these unirradiated samples are reported in Table 3 below.

Table 3

EFFECT OF MICROCRYSTALLINE WAX ON GLOSS AND GLOSS STABILITY OF 200 NEUTRAL WAX

|  | 200 wax without microcrystalline wax | 200 wax with 1 wt. percent microcrystalline wax |
| --- | --- | --- |
| initial gloss | 27 | 26 |
| gloss retained after 7 days at 73° F | 34 | 18 |

From Table 1 above it is apparent that irradiation of the wax coating composition containing both paraffin and microcrystalline waxes with gamma radiation resulted in vastly improved gloss stability. While the initial gloss of the irradiated samples did not show any substantial improvement, and in the case of the sample irradiated in air was actually somewhat lower than the initial gloss of the unirradiated sample, the gloss retained after seven days was vastly improved by the radiation treatment. Irradiation of the wax coating composition in air resulted in a wax coating composition which retained more than twice as much gloss as retained by the unirradiated sample while irradiation of the wax composition under a nitrogen atmosphere resulted in a wax coating composition which retained four times as much gloss as the unirradiated sample after seven days' storage. Since very few, if any, products coated with such wax coating compositions are consumed within seven days of manufacture, the importance of the ability of the wax coating composition to retain gloss for a period of time is obvious. The improvement in retained gloss (gloss stability) following irradiation of the wax coating composition described above is remarkable and the reasons for this improvement are not completely understood. Table 2 above makes it clear that the addition of at least some microcrystalline wax to the paraffin wax is necessary in order to obtain any substantial increase in gloss stability by the radiation treatment while Table 3 shows clearly that addition of microcrystalline wax to paraffin was does not in itself improve the gloss stability of the wax. On the contrary, addition of only 1% microcrystalline wax to the 200 neutral wax appears to substantially harm the gloss stability of the 200 neutral wax.

The importance of treating wax coating compositions containing both paraffin and microcrystalline waxes in accordance with the invention may be more fully appreciated when it is realized that, although the addition of microcrystalline wax to paraffin wax has an adverse effect on gloss stability as indicated in Table 2 and as also indicated by a comparison of Tables 1 and 3, the addition of microcrystalline wax to paraffin wax coating compositions is generally desirable since the microcrystalline wax serves in many instances to improve the mechanical strength of the wax coating composition. Previously, addition of microcrystalline wax for this purpose could be carried out only at the expense of gloss stability. Irradiation of the wax coating composition containing both microcrystalline and paraffin waxes in accordance with the present invention now provides means for utilizing the microcrystalline wax while avoiding any substantial loss in gloss stability. Wax manufacturers may now enjoy all of the advantages of the addition of microcrystalline wax without the previously suffered disadvantage of loss of gloss stability.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:

1. The process for improving the gloss stability of a wax coating composition consisting essentially of paraffin wax and containing between about 0.1 and about 50 weight percent microcrystalline wax which comprises subjecting said composition to between about $10^7$ and about $10^9$ roentgens of gamma radiation.

2. The process for improving the gloss stability of a wax coating composition comprising a major proportion of paraffin wax having a melting point between about 120 and about 150° F. and between about 0.1 and about 25 weight percent of a microcrystalline wax having a melting point between about 150 and about 200° F. which comprises subjecting the same to between about $10^7$ and about $10^9$ roentgens of gamma radiation.

3. The process for improving the gloss stability of a wax coating composition consisting essentially of paraffin wax melting between about 140 and about 150° F. and between about 0.5 and about 10 weight percent microcrystalline wax melting between about 170 and about 200° F. which comprises subjecting said composition to between about $10^7$ and about $10^9$ roentgens of gamma radiation.

References Cited in the file of this patent

UNITED STATES PATENTS

| 2,127,668 | Adams et al. | Aug. 23, 1938 |
| 2,904,482 | Thwaites et al. | Sept. 15, 1959 |